UNITED STATES PATENT OFFICE.

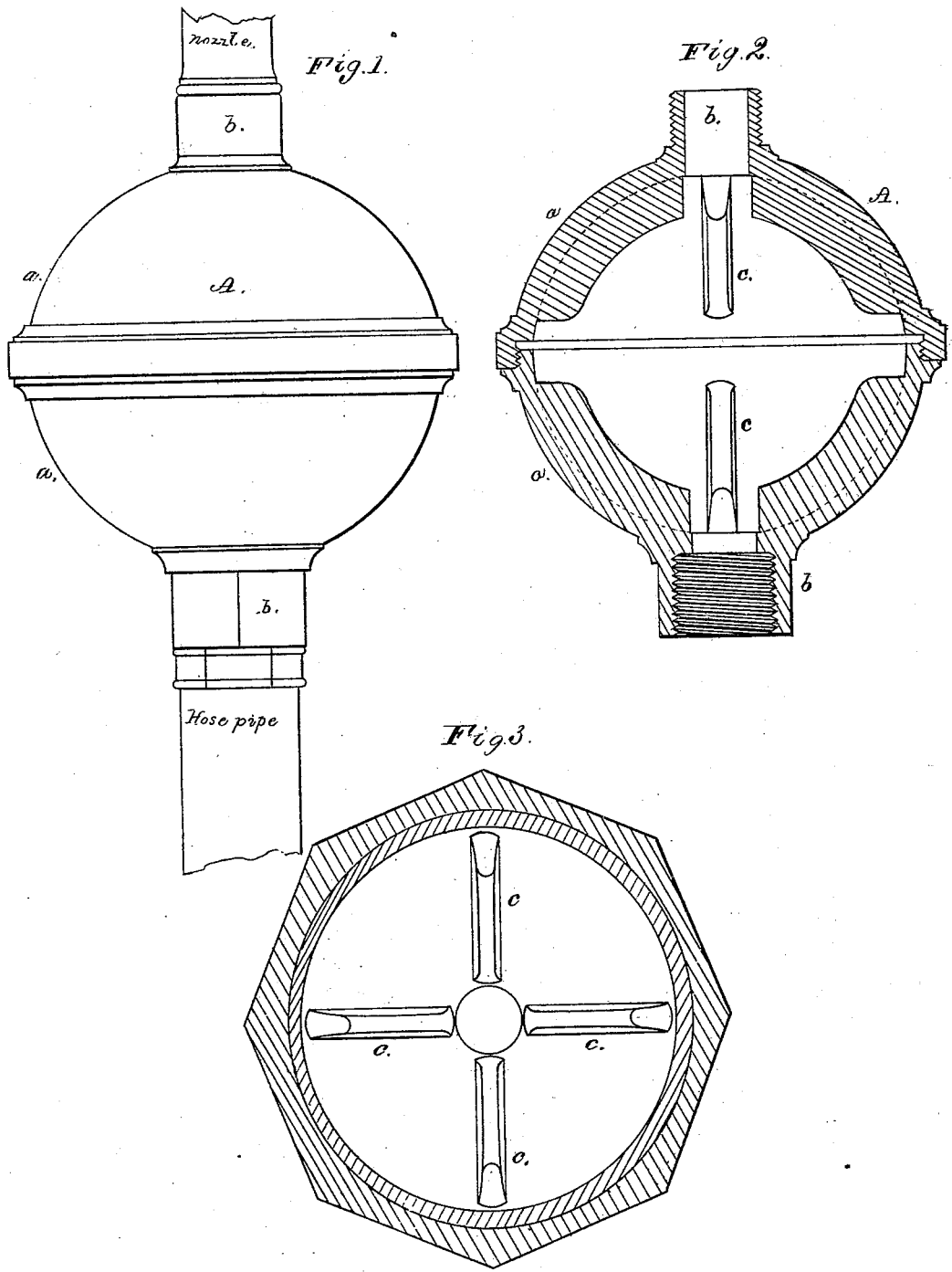

WILLIAM F. WHEELER, OF DORCHESTER, MASSACHUSETTS.

IMPROVEMENT IN FERTILIZER-DISTRIBUTERS.

Specification forming part of Letters Patent No. 165,773, dated July 20, 1875; application filed April 7, 1875.

*To all whom it may concern:*

Be it known that I, WILLIAM F. WHEELER, of Dorchester, in the county of Norfolk and State of Massachusetts, have invented certain new and useful device to be applied to a pipe or conduit for holding a concentrated fertilizer or other soluble compound in a solid or semi-solid form; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to produce a device for holding a concentrated fertilizer or other soluble compound in a solid or semi-solid state, which, when such device is supplied with the compound and applied to a conduit or pipe through which water is to be passed, or forced under any suitable head or pressure, shall not interrupt the flow of the water through the nozzle or outlet of the pipe, but such fertilizer or compound shall be caused by the friction of the water to be slowly disintegrated or dissolved, so as to uniformly impregnate the water and enable it, thus impregnated, to be readily diffused or showered upon plants, flowers, &c., in order to promote their growth, prevent their mildew, or destroy the insects upon them; and my invention consists in the arrangement of a case or chamber to receive a solidified or semi-solidified compound in a pipe or conduit through which water is to pass or be forced, such device being constructed and arranged to permit the water to freely pass through the same without interrupting or slightly impeding its flow, while such flowage or impingement of the water against the surface of such compound causes the latter to be gradually disintegrated or dissolved, so as to be readily and equably diffused or distributed by means of the head or force of the water upon the plants, &c.

My invention is especially designed for use in green-houses, although equally adapted to be used in flower-gardens, &c.

In the accompanying drawing, Figure 1 denotes a side elevation, Fig. 2 a vertical section, and Fig. 3 a horizontal section, of a device constructed in accordance with my invention.

In the said drawing, A denotes a hollow vessel, which may be globular or any other desirable form, made in two halves or parts, $a\ a$, which are connected by a screw-connection, each of such halves being provided with a hollow neck, $b$, communicating with the interior of the vessel, and having a screw cut upon it to connect the one with a main supply pipe or hose, and the other with a nozzle or distributer. Each part $a\ a$ is provided on its inner surface with four or any other desirable number of ribs, $c$, which extend toward and terminate near the mouth of the hollow neck $b$. These ribs may be either straight or spiral, as may be preferred. The object of these ribs is to support a mass of conglomerated material, reduced to a solidified form, near the center of the vessel or holder, and so as to afford a free, uninterrupted space entirely around the same, and thereby enable the water, when caused to flow through the holder, to impinge against the solidified compound, and slowly decompose or dissolve such compound and uniformly impregnate the water.

I would remark that this device or chamber for holding the fertilizer or compound, although principally intended to be used with a hose-pipe connected with a water-main, and operated by the head or pressure of the water, may be used with good effect in a watering-pot, the chamber or holder being arranged in the lower part of the spout.

In preparing the fertilizer or compound I prefer to take what is known in commerce as "whale-oil soap" as a basis, and mix therewith the material or materials desired to be diffused upon the plants, &c. For instance, if I wish to obtain a compound containing tobacco, guano, or sulphur, or all of them combined, I first reduce the material or materials to a fine, pulverized state. I next take any given quantity of the said soap, and add thereto and thoroughly commingle therewith, by manipulating, kneading, or mechanical action, as much of either or all the materials as the soap, by its cohesive power, will preserve in a plastic state or without crumbling, such quantity being about equal to the weight of the soap. The consistency of the compound may be greater or less, in accordance with the greater or less degree of impregnation desired to be given to the water. This mass, thus rendered homogeneous, I break or cut up, and roll into balls or cakes of such a size as can be readily placed in the holder or chamber.

This device, provided with a disinfecting material or compound, may also be applied to sewer-pipes for disinfecting or cleansing the same, or for cleansing the floors of slaughter-houses, stables, &c.

I would also remark that this device may, if desirable, be employed for distributing volatile substances such as cannot be fixed in a conglomerate mass—for instance, sulphate and carbonate of ammonia. In such case a hollow perforated metallic ball, or case filled with the material, may be used in the chamber or holder, the action of the water in flowing through the same serving to gradually impregnate the water. The fertilizer or other compound, being placed in the holder or chamber attached to a hose or conduit through which water is to pass or be forced, such water, by its pressure and friction on the compound, disintegrates the latter, and impregnates the water, which may be diffused as occasion may require.

From the above it will be seen that water may be impregnated with the desired elements for the nutrition, washing, and protection of the plants, &c., and with great economy in the labor of applying the same.

Having described my invention, what I claim is—

1. The above-described improved device for attachment to a hose-pipe or other conduit through which water is to pass, the same consisting of a holder, A, formed in two parts, $a$ $a$, and provided with a series of internal ribs, $c$, arranged substantially in manner and for the purpose set forth.

2. The improved method of gradually and equably impregnating water with fertilizing and other materials, and diffusing the same upon plants, &c., the same consisting in forming the elements or materials into a solidified or semi-solidified homogeneous mass, and placing the same, so formed, in a holder or chamber connected with or arranged in a hose-pipe or other conduit, through which water is forced or caused to pass, whereby the action or friction of the water shall gradually disintegrate the compound, and the impregnated water be diffused, substantially in manner and for the purpose set forth.

In testimony that I claim the foregoing as my own invention I affix my signature in presence of two witnesses.

WM. F. WHEELER.

Witnesses:
  F. P. HALE,
  F. C. HALE.